United States Patent
Musku et al.

(10) Patent No.: US 10,999,189 B2
(45) Date of Patent: May 4, 2021

(54) ROUTE OPTIMIZATION USING REAL TIME TRAFFIC FEEDBACK

(71) Applicant: Cisco Technology, Inc., San Jose, CA (US)

(72) Inventors: Amarender Musku, Santa Clara, CA (US); Mahendra Kumar Samarya, Fremont, CA (US); Harini Venkateswaran, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/544,753

(22) Filed: Aug. 19, 2019

(65) Prior Publication Data

US 2020/0162371 A1 May 21, 2020

Related U.S. Application Data

(60) Provisional application No. 62/770,146, filed on Nov. 20, 2018.

(51) Int. Cl.
| | |
|---|---|
| *H04L 12/66* | (2006.01) |
| *H04L 12/725* | (2013.01) |
| *H04L 12/715* | (2013.01) |
| *H04L 12/741* | (2013.01) |
| *H04L 12/733* | (2013.01) |

(52) U.S. Cl.
CPC .......... *H04L 45/3065* (2013.01); *H04L 45/04* (2013.01); *H04L 45/20* (2013.01); *H04L 45/302* (2013.01); *H04L 45/54* (2013.01)

(58) Field of Classification Search
CPC ..... H04L 45/3065; H04L 45/04; H04L 45/20; H04L 45/302; H04L 45/54
See application file for complete search history.

(56) References Cited

U.S. PATENT DOCUMENTS

| | | | |
|---|---|---|---|
| 7,899,048 B1 * | 3/2011 | Walker | H04L 43/18 370/390 |
| 8,125,897 B2 | 2/2012 | Ray et al. | |
| 8,601,155 B2 | 12/2013 | Toombs et al. | |
| 9,264,341 B2 | 2/2016 | Ma et al. | |
| 10,116,709 B1 | 10/2018 | Kielhofner et al. | |

(Continued)

*Primary Examiner* — Abdelnabi O Musa
(74) *Attorney, Agent, or Firm* — Polsinelli PC

(57) ABSTRACT

Systems and methods provide for route optimization using real time traffic feedback. A network management system can subscribe to receive streaming telemetry (e.g., at line rate) for traffic associated with one or more managed network entities (e.g., flows, sites, networks, network devices, endpoints, applications, etc.) selected for route optimization. The network management system can determine a set of possible routes for the traffic. The network management system can compute metrics (e.g., packet loss, bit rate, throughput, delay, availability, jitter, etc.) for a set of possible routes for the traffic based on the streaming telemetry. The network management system can determine an optimal route from the set of possible routes based on the metrics. The network management system can inject the optimal route into the one or more network devices receiving the traffic to override a native route (e.g., determined by a routing protocol executed by the network devices).

20 Claims, 16 Drawing Sheets

(56) References Cited

U.S. PATENT DOCUMENTS

| | | | |
|---|---|---|---|
| 2008/0043716 A1* | 2/2008 | Toombs | H04L 45/00 370/351 |
| 2010/0054152 A1* | 3/2010 | Foschiano | H04L 41/0886 370/253 |
| 2016/0255050 A1 | 9/2016 | Grayson et al. | |
| 2017/0093685 A1* | 3/2017 | Retana | H04L 45/02 |
| 2018/0262585 A1* | 9/2018 | Zandi | H04L 43/08 |
| 2019/0168696 A1* | 6/2019 | Lau | H04L 67/12 |

* cited by examiner

ROUTE OPTIMIZATION USING REAL TIME TRAFFIC FEEDBACK

CROSS-REFERENCE TO RELATED APPLICATIONS

This application claims priority to U.S. Provisional Patent Application No. 62/770,146, filed on Nov. 20, 2018, the content of which is incorporated by reference in its entirety.

TECHNICAL FIELD

The subject matter of this disclosure relates in general to the field of computer networking, and more particularly, to systems and methods for route optimization using real time traffic feedback.

BACKGROUND

Networks allow people to communicate, collaborate, and interact in many ways. For example, networks can be used to access web pages, talk using Internet Protocol (IP) telephones, participate in video conferences, compete in interactive gaming, shop using the Internet, complete online coursework, and so forth. An important element of a network is a router. A router can connect one network to another network. The router can be responsible for the delivery of packets across different networks. The destination of a packet might be a web server in another country or an email server on the local area network (LAN). The router can use its routing table to determine a path to use to forward the packet. It can be the responsibility of a router to deliver that packet in a timely manner. The effectiveness of internetwork communications can therefore depend, to a large degree, on the ability of a router to forward packets in the most efficient way possible.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
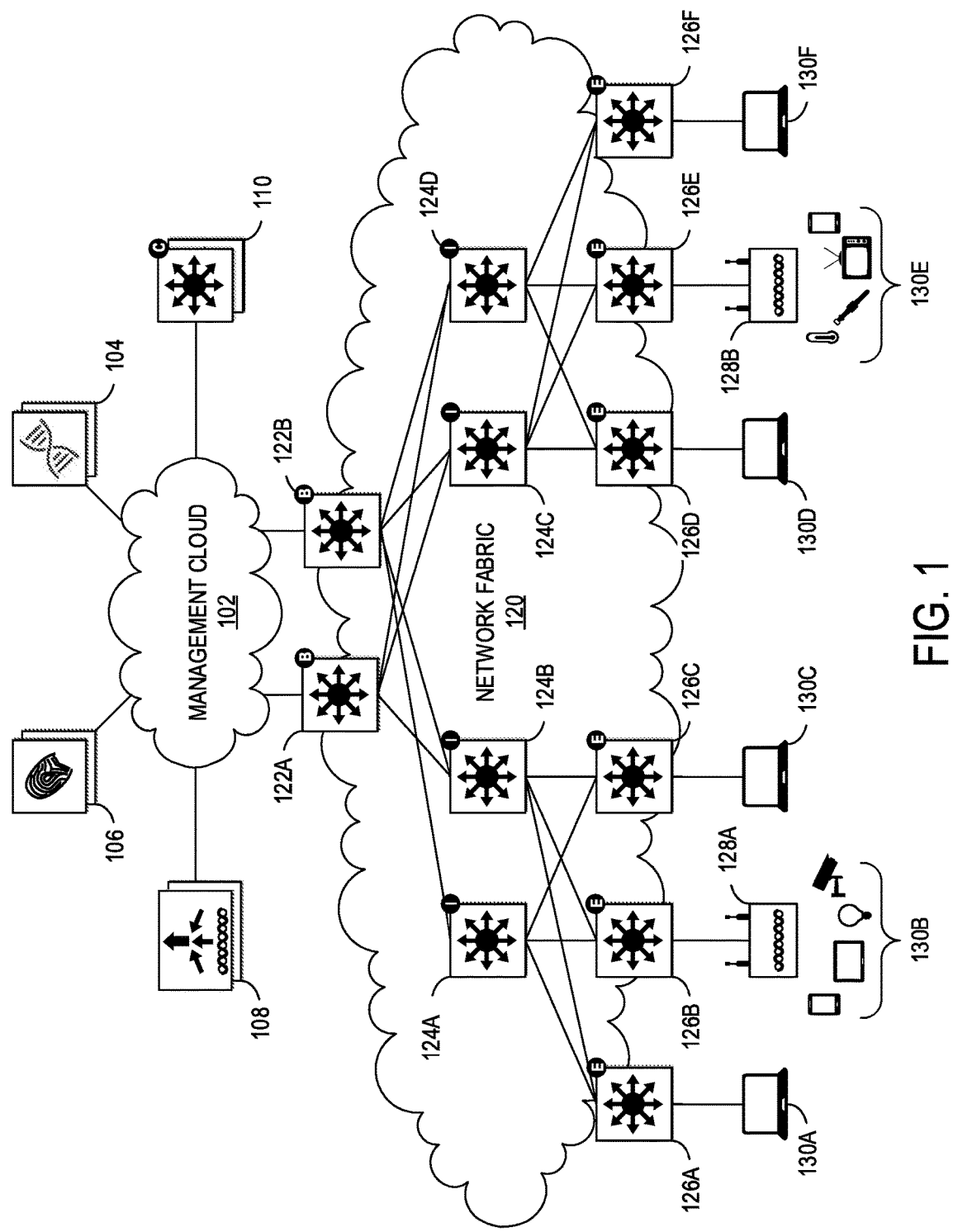
FIG. 1 illustrates an example of a physical topology of an enterprise network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Building and maintaining a routing table can involve multiple processes, including routing processes, which can run a network (or routing) protocol (e.g., Enhanced Interior Gateway Routing Protocol (EIGRP), Border Gateway Protocol (BGP), Intermediate System-to-Intermediate System (IS-IS), Open Shortest Path First (OSPF), Routing Information Protocol (RIP), etc.); the routing table itself, which can receive information from the routing processes and respond to requests for information from a forwarding process, and the forwarding process, which can request information from the routing table to make a packet forwarding decision.

Certain factors may be used to build the routing table, such as administrative distance, metrics, and prefix length. The administrative distance can be the measure of trustworthiness of the source of a route. For example, if a router learns about a destination from more than one routing protocol, the administrative distances of each routing protocol may be compared and preference given to the routes with lower administrative distances.

Metrics can be measures used by a routing protocol to calculate the best path to a given destination if the protocol learns multiple paths to the same destination. Metrics can be based on either a single characteristic or several characteristics of a path, such as hop count, bandwidth, delay, load, reliability, and so forth. If there are multiple paths to the same destination with equal metrics or within a predetermined range of one another, the router can load balance between and among these paths.

Destinations with common prefixes but different prefix lengths (e.g., 192.168.32.0/26 and 192.168.32.0/24) may be stored as separate entries in the routing table. Routers may give priority to routes with longer prefix lengths and may forward traffic based on the longest matching prefix length in the routing table.

As each routing process receives updates and other information, a routing protocol can select the best path to any given destination and attempt to install this path into the routing table. The router can decide whether or not to install the routes presented by the routing processes based on the administrative distance of each route. If a path has the lowest administrative distance to a destination (when compared to the other routes in the table), the path may be installed in the routing table. If the path is not the route with the lowest administrative distance, then the router may reject the route.

Routes that are not installed in the routing table can be handled in various ways. One approach can be to have each routing process attempt to install its best routes periodically. If the most preferred route fails, the next best route (according to administrative distance) can succeed on the next attempt. Another approach is for the routing protocol that failed to install its route in the table to hang on to the route (such as in a topology table), and tell the routing table process to report if the best path fails. For protocols that do not have their own routing information tables, such as Interior Gateway Routing Protocol (IGRP), the first approach may be used. For example, when IGRP receives an update about a route, it may attempt to install the updated information in the routing table. If there is already a route to this same destination in the routing table, the installation attempt may fail. For protocols that have their own database of routing information, such as EIGRP, IS-IS, OSPF, BGP, and RIP, a backup route can be registered when the initial attempt to install the route fails. If the route installed in the routing table fails, the routing table maintenance process can call each routing protocol process that has registered a backup route, and ask them to reinstall the route in the routing table. If there are multiple protocols with registered backup routes, the preferred route may be chosen based on administrative distance.

Conventional routing processes are typically only concerned with reachability and do not look into conditions when there may be heavy traffic loss and/or delay. For example, conventional implementations of EIGRP, although capable of using bandwidth, delay, load, and reliability as routing metrics, may actually rely on bandwidth and delay only, where bandwidth and delay are constant values based upon interface bandwidth values reported by a router. Thus, routes may not change unless a new node or link becomes available or there is a node or link failure. Conventional approaches that attempt to dynamically measure bandwidth, delay, load, and reliability often use active probing in the control plane and compute round trip metrics, which can add load on the control plane and increase central processing unit (CPU) utilization by network devices and may not optimize for unidirectional traffic flow. Other conventional approaches that monitor network performance in the data plane may only examine link utilization, rely on averaging, and/or require some period of time before convergence.

Some routers can include support for congestion management, which can entail the creation of queues, assignment of packets to those queues based on the classification of the packet, and scheduling of the packets in a queue for transmission. During periods with light traffic, that is, when no congestion exists, packets may be sent out the interface as soon as they arrive. During periods of transmit congestion at the outgoing interface, packets may arrive faster than the interface can send them. If the router implements congestion management, packets accumulating at an interface can be queued until the interface is free to send them; they are then scheduled for transmission according to their assigned priority and the queuing mechanism configured for the interface. The router can determine the order of packet transmission by controlling which packets are placed in which queue and how queues are serviced with respect to each other.

Some examples of queuing mechanisms include first-in, first out (FIFO), weighted fair queuing (WFQ), custom queuing (CQ), and priority queuing (PQ). FIFO may entail no concept of priority or classes of traffic. With FIFO, transmission of packets out the interface can occur in the order the packets arrive. WFQ can offer dynamic, fair queuing by dividing bandwidth across queues of traffic based on weights. WFQ can ensure that all traffic is treated fairly, given its weight. WFQ queues may be flow-based, distributed, class-based, distributed class-based, and so forth. CQ can allocate proportionally for each different class of traffic. CQ allows a network operator to specify the number of bytes or packets to be drawn from the queue, which can be useful on slow interfaces. PQ can ensure packets belonging to one priority class of traffic are sent before all lower priority traffic to ensure timely delivery of those packets.

Conventional congestion management, however, presumes a single route. Conventional congestion management may also not support tunneling and encryption because these features modify the packet content information that may be required for classification. In addition, PQ can deny lower priority traffic bandwidth in favor of higher priority traffic and could, in the worst case, result in lower priority traffic never being sent. PQ can also introduce extra overhead that may be acceptable for slow interfaces, but may not be acceptable for higher speed interfaces such as Ethernet. PQ can also cause network devices to take longer to switch packets because the packets are classified by the processor card. PQ uses a static configuration and does not adapt to changing network conditions.

Various embodiments of the present disclosure can overcome these and other deficiencies of the prior art by complementing conventional routing processes and congestion management to improve network performance, such as by utilizing real time traffic feedback to select a best path per flow during periods of traffic congestion and high network latency. In some embodiments, streaming telemetry from network devices can be provided in real time to a centralized network management system. The network management system can build a list of possible routes for traffic of interest, calculate the amount of time for the traffic of interest to traverse each possible route, and determine the optimal route based at least in part on the amount of time for the traffic of interest to traverse each possible route. The network management system can authorize the change of route priority for the traffic of interest based on the optimal route. For example, the network management system can inject the optimal route as a static or default route to override a native route (e.g., a route determined by a routing protocol running in the network) in a routing table of a network device. Route optimization can occur hop-to-hop, segment-to-segment, or end-to-end depending on the administrative privileges of the network management system.

In some embodiments, the network management system can collect the streaming telemetry over a duration and identify periods of time or other patterns or trends indicative of traffic congestion and high network latency. The network management system can preemptively or proactively inject optimal routes during periods of time of low bandwidth or delay or when the network management system detects or predicts these conditions. The network management system can eject alternative routes when these periods of time or events subsist. Numerous other functions and advantages are described and suggested below in accordance with the various embodiments.

Systems and methods provide for route optimization using real time traffic feedback. A network management system can subscribe to receive streaming telemetry (e.g., at line rate) for traffic associated with one or more managed network entities (e.g., flows, sites, networks, network devices, endpoints, applications, etc.) selected for route optimization. The network management system can determine a set of possible routes for the traffic. The network management system can compute metrics (e.g., packet loss, bit rate, throughput, delay, availability, jitter, etc.) for a set of possible routes for the traffic based on the streaming telemetry. The network management system can determine an optimal route from the set of possible routes based on the metrics. The network management system can inject the optimal route into the one or more network devices receiving the traffic to override a native route (e.g., determined by a routing protocol executed by the network devices).

Example Embodiments

FIG. 1 illustrates an example of a physical topology of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliances 104 can function as the command and control system for one or more network fabrics, and can house automated workflows for deploying and managing the network fabrics. The network controller appliances 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliances 104.

The AAA appliances 106 can control access to computing resources, facilitate enforcement of network policies, audit usage, and provide information necessary to bill for services. The AAA appliance can interact with the network controller appliances 104 and with databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The WLCs 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLCs 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane nodes 110 are shown to be external to the network fabric 120 in this example, in other embodiments, the fabric control plane nodes 110 may be co-located with the network fabric 120. In embodiments where the fabric control plane nodes 110 are co-located with the network fabric 120, the fabric control plane nodes 110 may comprise a dedicated node or set of nodes or the functionality of the fabric control nodes 110 may be implemented by the fabric border nodes 122.

The fabric control plane nodes 110 can serve as a central database for tracking all users, devices, and things as they attach to the network fabric 120, and as they roam around. The fabric control plane nodes 110 can allow network infrastructure (e.g., switches, routers, WLCs, etc.) to query the database to determine the locations of users, devices, and things attached to the fabric instead of using a flood and learn mechanism. In this manner, the fabric control plane nodes 110 can operate as a single source of truth about where every endpoint attached to the network fabric 120 is located at any point in time. In addition to tracking specific endpoints (e.g., /32 address for IPv4, /128 address for IPv6, etc.), the fabric control plane nodes 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLCs 108 notifying the fabric control plane nodes 110 of joins, roams, and disconnects by the wireless endpoints 130 such that the fabric control plane nodes can have connectivity information about both wired and wireless endpoints in the network fabric 120, and can serve as the single source of truth for endpoints connected to the network fabric. For data plane integration, the WLCs 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLCs 108 can onboard the endpoints into the network fabric 120 and inform the fabric control plane nodes 110 of the endpoints' Media Access Control (MAC) addresses. The WLCs 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane nodes 110 to form a mapping between the endpoints' MAC and IP addresses, and traffic to and from the wireless endpoints 130 can begin to flow.

Figure 2:
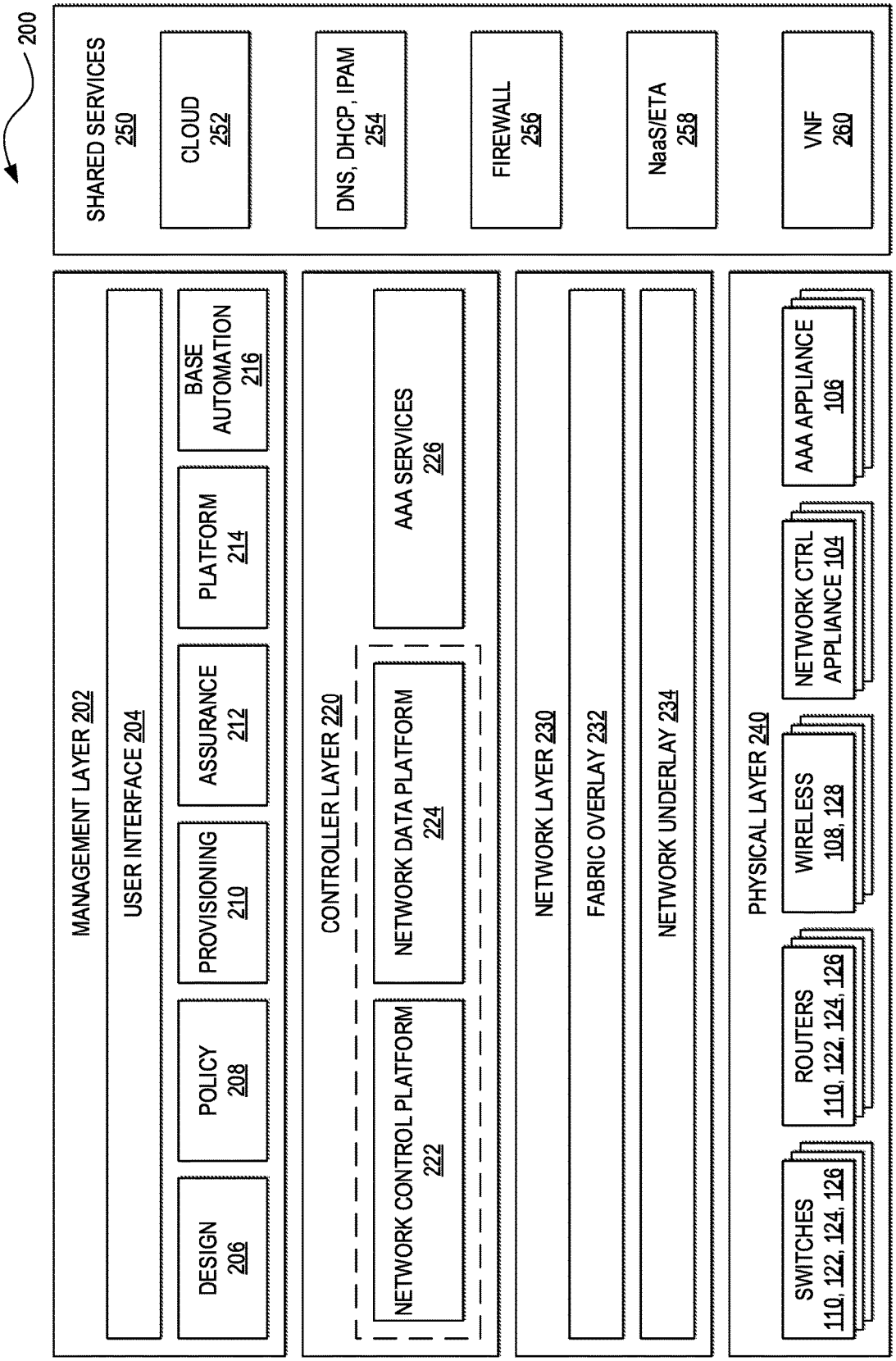
FIG. 2 illustrates an example of a logical architecture for an enterprise network in accordance with an embodiment.

FIG. 2 illustrates an example of a software architecture or logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to endpoints of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
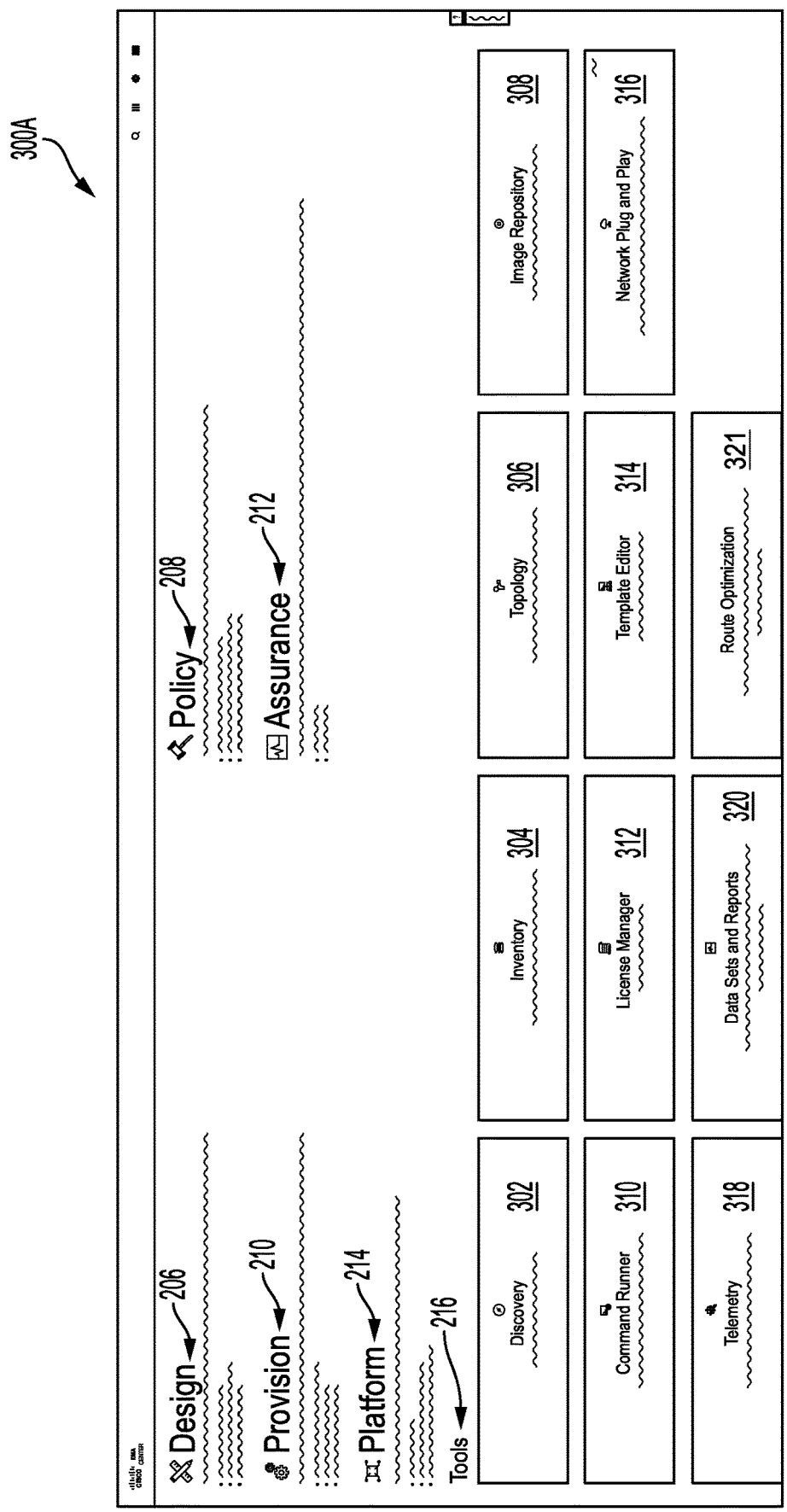
FIGS. 3A-3I illustrate examples of graphical user interfaces for a network management system in accordance with an embodiment.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network devices to populate into inventory;

An inventory management tool 304 for managing the set of physical and virtual network elements;

A topology tool 306 for visualizing the physical topology of network devices;

An image repository tool 308 for managing software images for network devices;

A command runner tool 310 for diagnosing one or more network devices based on a CLI;

A license manager tool 312 for administering visualizing software license usage in the network;

A template editor tool 314 for creating and authoring CLI templates associated with network devices in a design profile;

A network PnP tool 316 for supporting the automated configuration of network devices;

A telemetry tool 318 for designing a telemetry profile and applying the telemetry profile to network devices; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

A route optimization tool 321 for supplementing routing of selected flows by using real time traffic feedback to select a best path for selected flows during periods of traffic congestion.

Figure 3B:
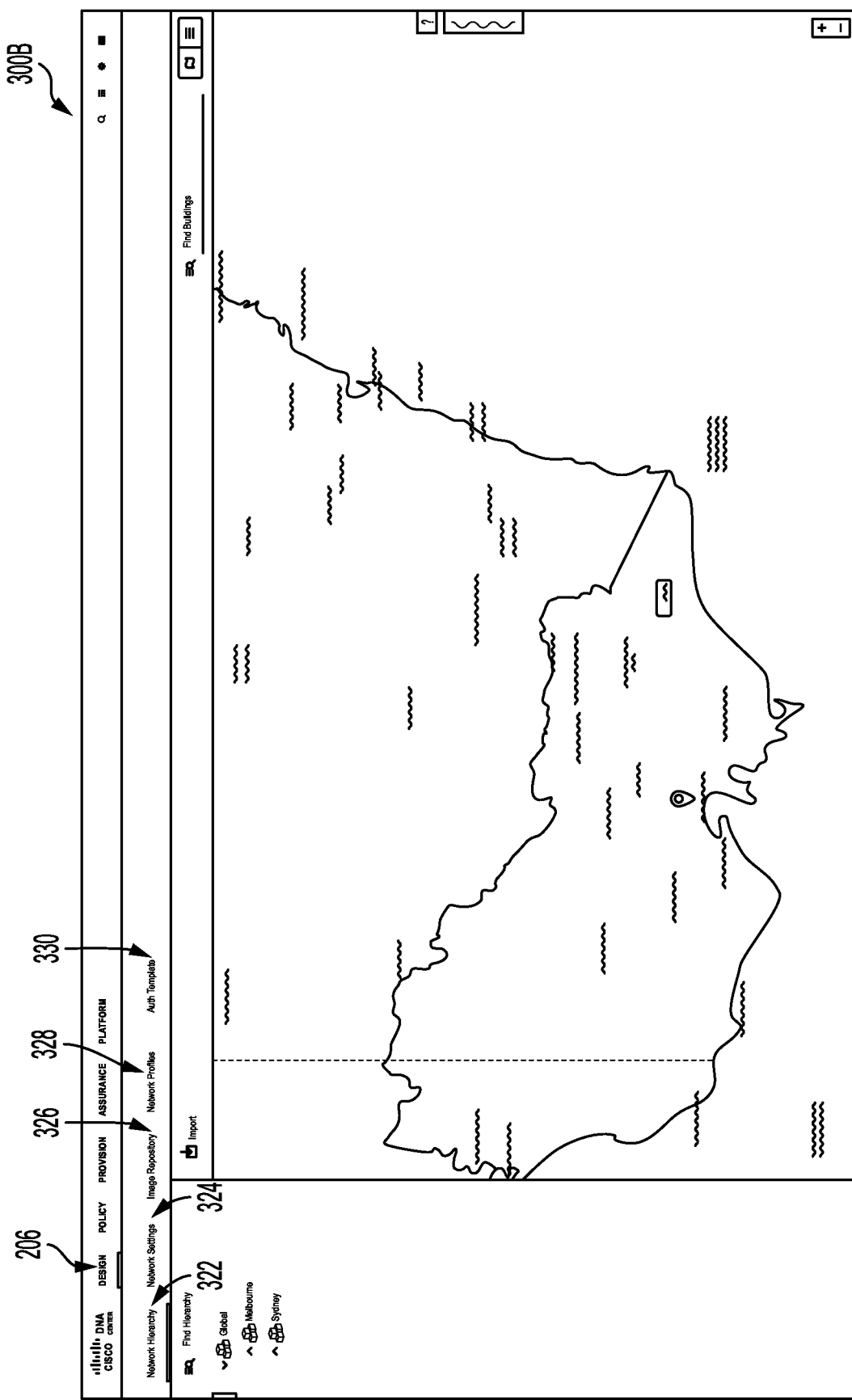

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., Quality of Service (QoS) classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
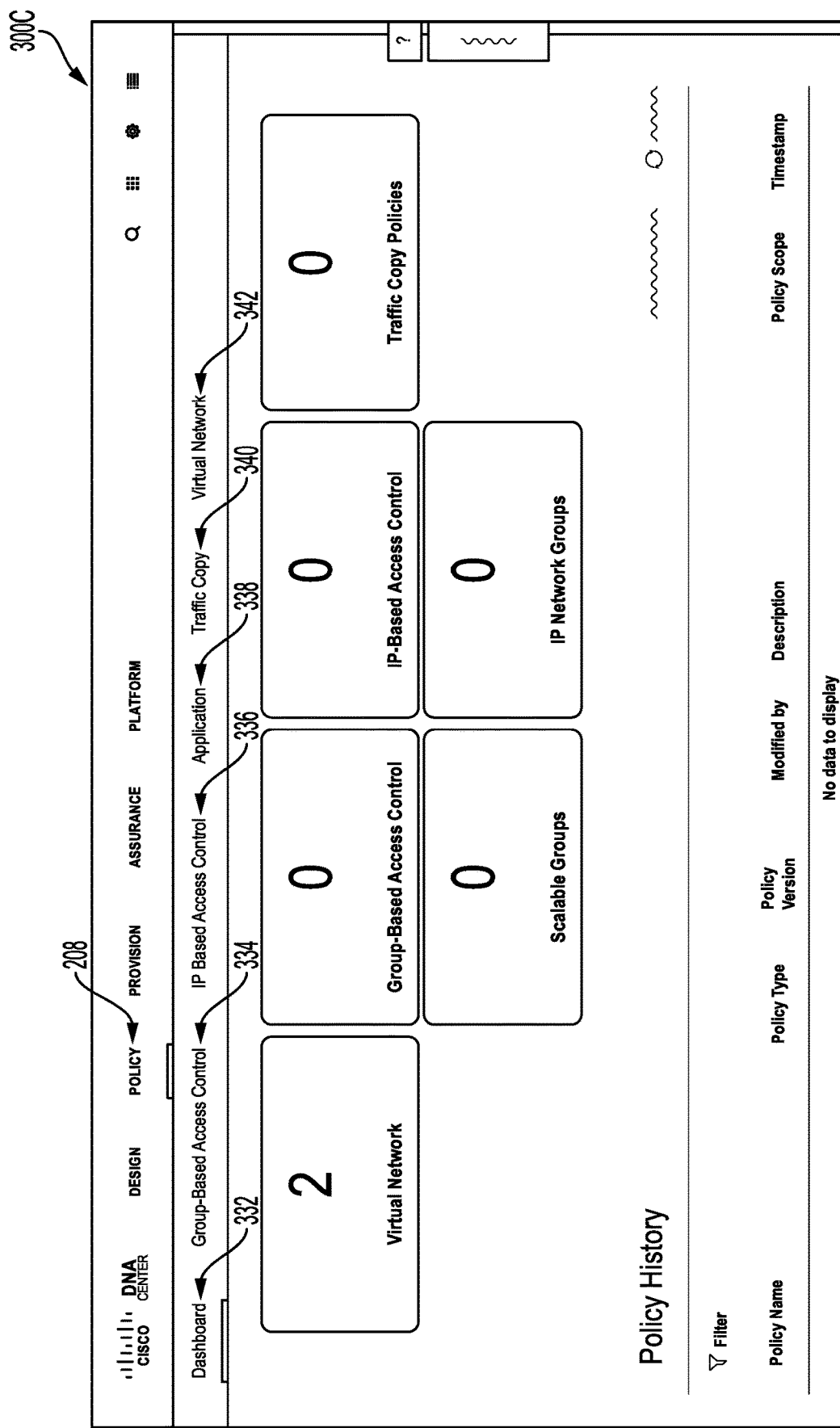

FIG. 3C illustrates a graphical user interface 300C, an example of a landing screen for the policy functions 208.

The graphical user interface 300C can include various tools and workflows for defining network policies. In this example, the policy design tools and workflows include:

- A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;
- A group-based access control policies tool 334 for managing group-based access controls or SGACLs. A group-based access control policy can define scalable groups and an access contract (e.g., rules that make up the access control policies, such as permit or deny when traffic matches on the policy);
- An IP-based access control policies tool 336 for managing IP-based access control policies. An IP-based access control can define an IP network group (e.g., IP subnets that share same access control requirements) and an access contract;
- An application policies tool 338 for configuring QoS for application traffic. An application policy can define application sets (e.g., sets of applications that with similar network traffic needs) and a site scope (e.g., the site to which an application policy is defined);
- A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and
- A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
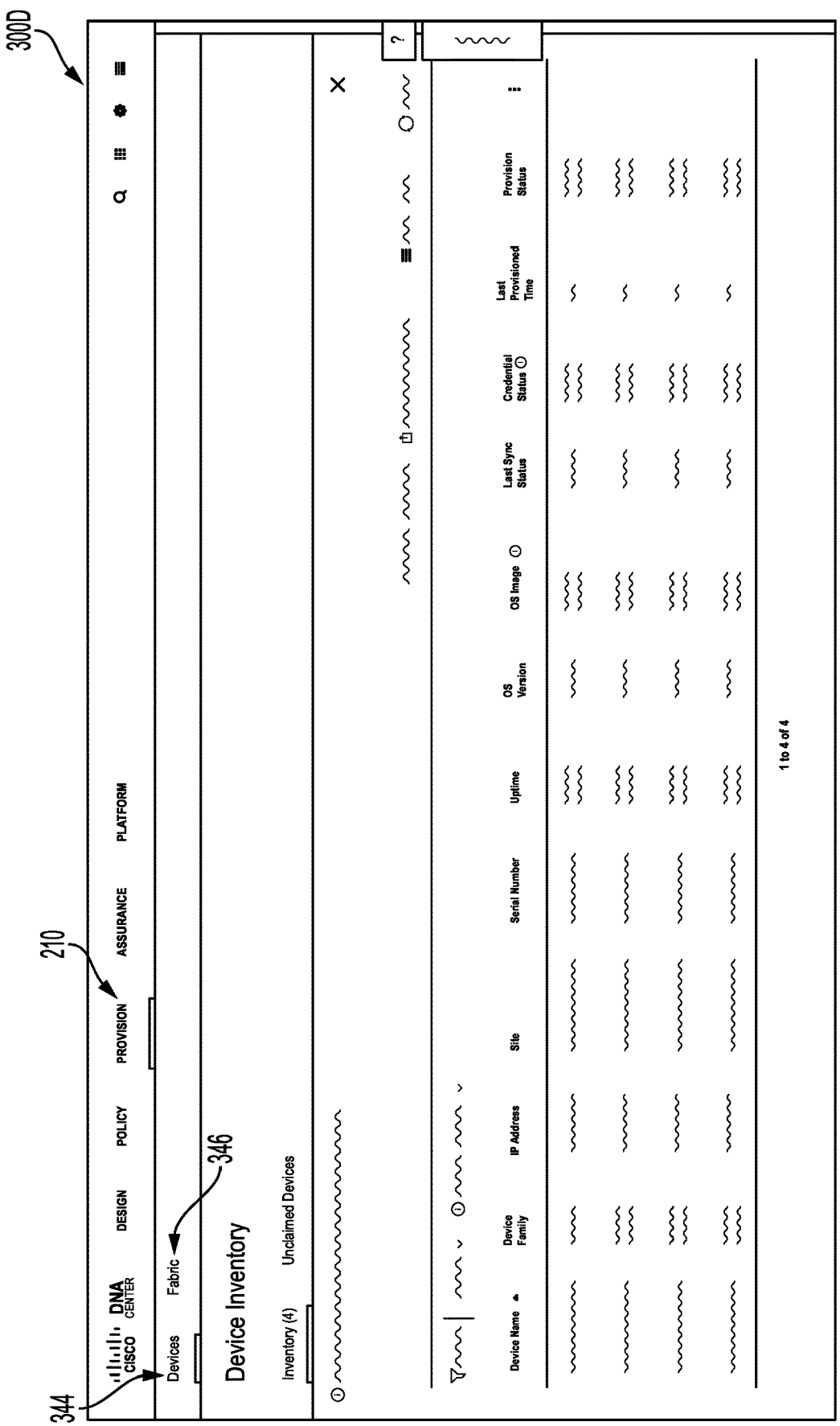

FIG. 3D illustrates a graphical user interface 300D, an example of a landing screen for the provisioning functions 210. The graphical user interface 300D can include various tools and workflows for deploying the network. In this example, the provisioning tools and workflows include:

- A device provisioning tool 344 for assigning devices to the inventory and deploying the required settings and policies, and adding devices to sites; and
- A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
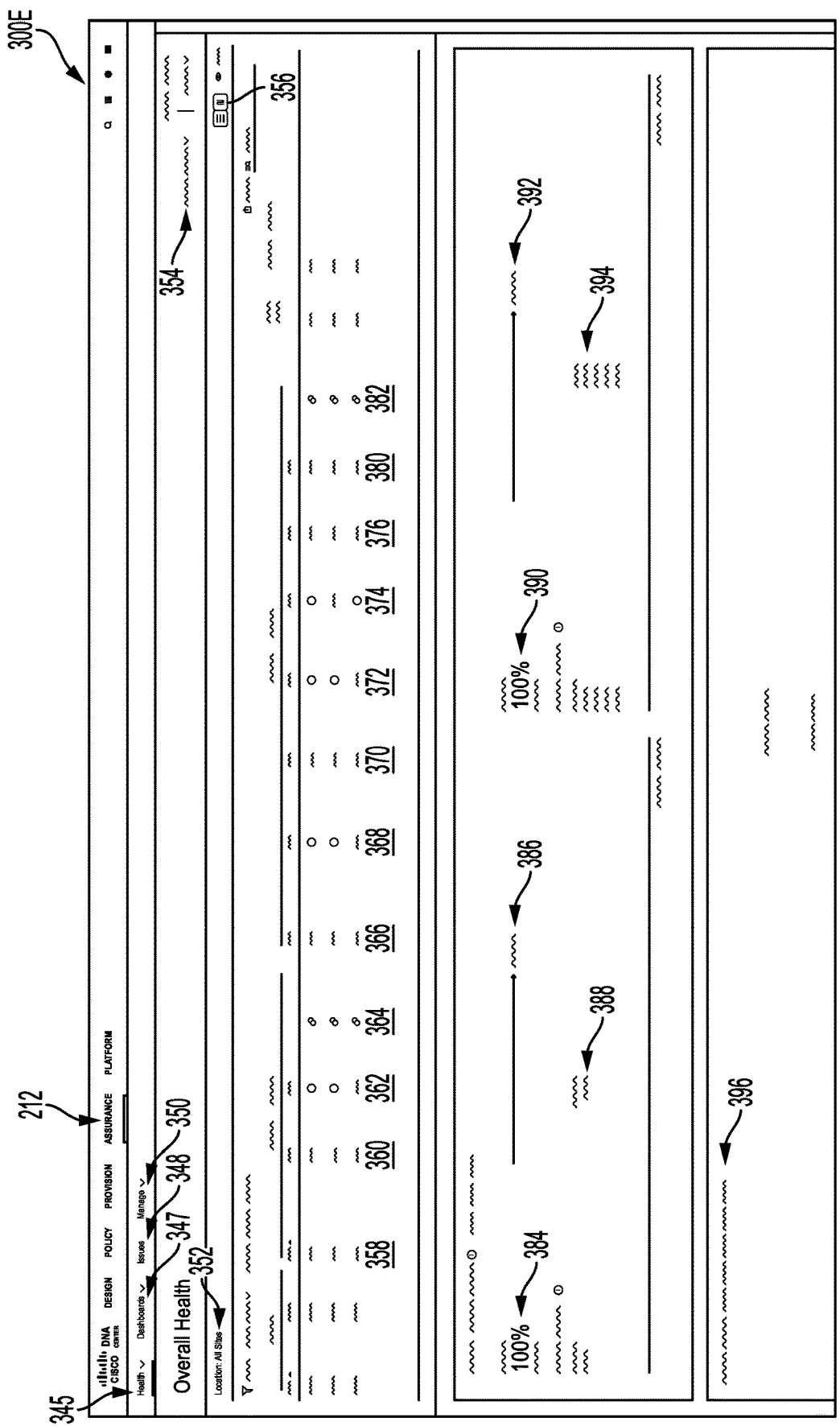

FIG. 3E illustrates a graphical user interface 300E, an example of a landing screen for the assurance functions 212. The graphical user interface 300E can include various tools and workflows for managing the network. In this example, the assurance tools and workflows include:

- A health overview tool 345 for providing a global view of the enterprise network, including network devices and endpoints. The user interface element (e.g., drop-down menu, a dialog box, etc.) associated with the health overview tool 345 can also be toggled to switch to additional or alternative views, such as a view of the health of network devices alone, a view of the health of all wired and wireless clients, and a view of the health of applications running in the network as discussed further below with respect to FIGS. 3F-3H;
- An assurance dashboard tool 347 for managing and creating custom dashboards;
- An issues tool 348 for displaying and troubleshooting network issues; and
- A sensor management tool 350 for managing sensor-driven tests.

The graphical user interface 300E can also include a location selection user interface element 352, a time period selection user interface element 354, and a view type user interface element 355. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 354 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network devices by score, color, descriptor, and so forth; and column 380 can include user interface elements for drilling down to the health of the network devices associated with a hierarchical site/building. In other embodiments, endpoints may be grouped in other ways besides wired or wireless, such as by device type (e.g., desktop, laptop, mobile phone, IoT device or more specific type of IoT device, etc.), manufacturer, model, operating system, and so forth. Likewise, network devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network devices as a percentage, a color coded trend chart 392 indicating that percentage over a specific time period, and a device type user interface element 394 breaking down the number of network devices as a percentage by network device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
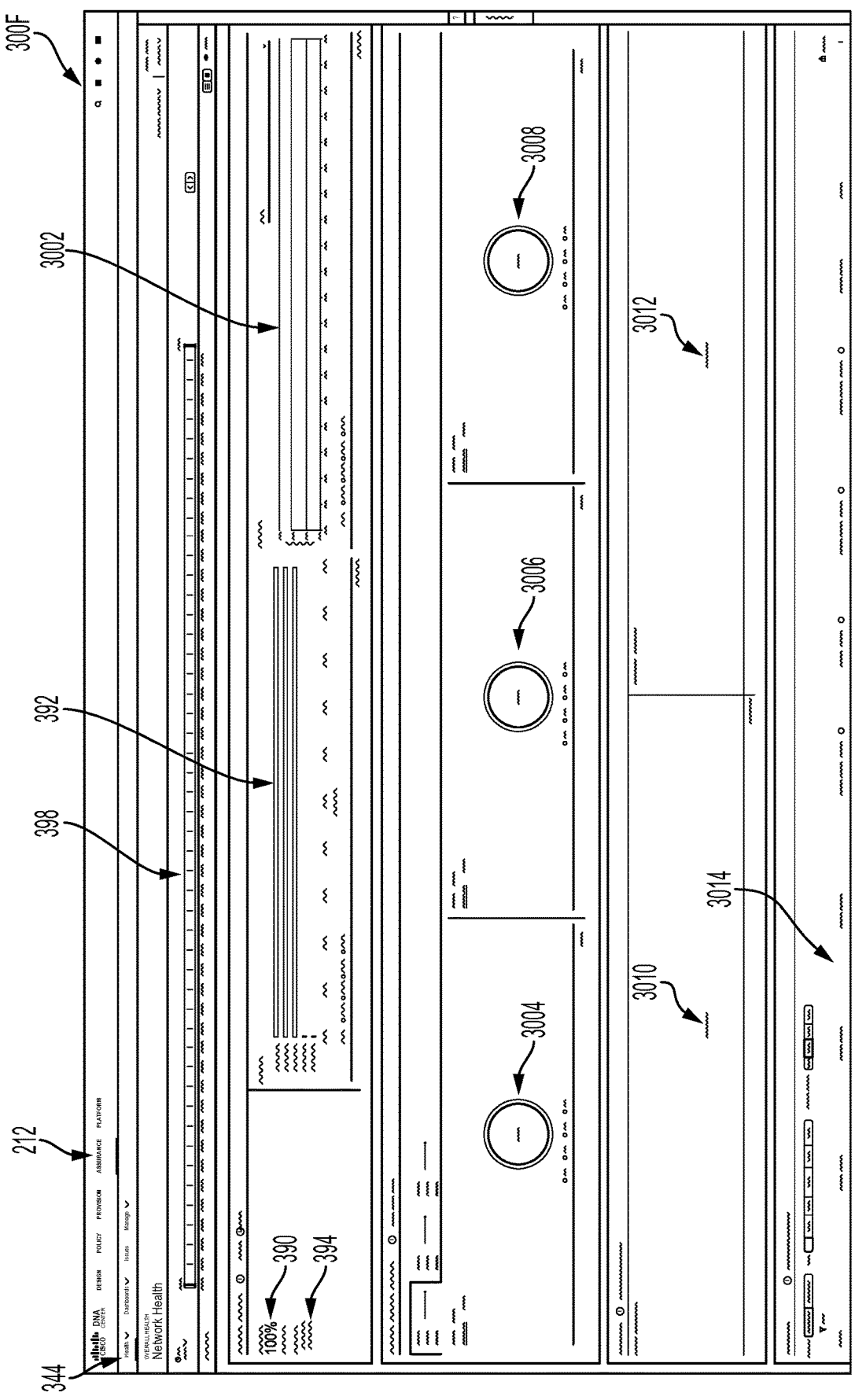

FIG. 3F illustrates a graphical user interface 300F, an example of a screen for an overview of the health of network devices alone, which may be navigated to, for instance, by toggling the health overview tool 345. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network devices) (not shown here), the number of healthy network devices as a percentage 390, the color coded trend charts 392 indicating that percentage by device type, the breakdown of the number of healthy network devices by device type, and so forth. In addition, the graphical user interface 300F can display a view of the health of network devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network device can also be provided by selecting that network device in the network devices table 3014.

Figure 3G:
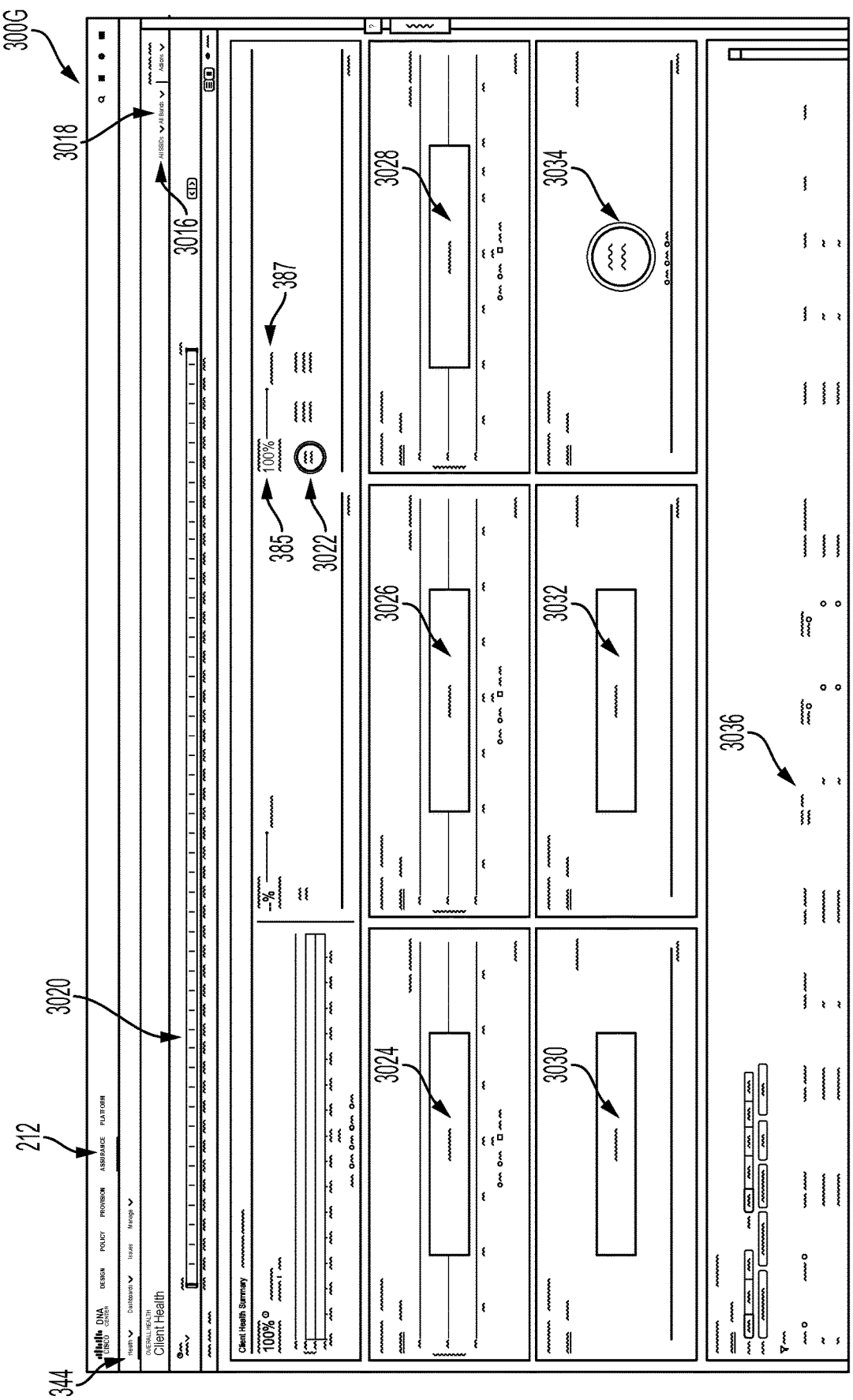

FIG. 3G illustrates a graphical user interface 300G, an example of a screen for an overview of the health of endpoints, which may be navigated to, for instance, by toggling the health overview tool 345. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a timeline slider 3020 that may operate similarly to the timeline slider 398.

The graphical user interface 300G can also include a client health summary user interface element that provides similar information to that shown in the graphical user interface 300E, such as the number of healthy clients as a percentage 385 and a color coded trend chart 387 indicating that percentage over a specific time period for each grouping of endpoints (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) endpoints. The count of endpoints associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
  Client onboarding times 3024;
  Received Signal Strength Indications (RSSIs) 3026;
  Connectivity signal-to-noise ratios (SNRs) 3028;
  Client counts per SSID 3030;
  Client counts per band frequency 3032;
  DNS requests and response counters (not shown); and
  Connectivity physical link state information 3034 indicating the distribution of wired endpoints that had their physical links up, down, and had errors.

In addition, the graphical user interface 300G can include an endpoints table 3036 enabling a user to filter endpoints by device type, health, data (e.g., onboarding time>threshold, association time>threshold, DHCP>threshold, AAA>threshold, RSSI>threshold, etc.), or custom filters), view, and export endpoint information (e.g., user identifier, hostname, MAC address, IP address, device type, last heard, location, Virtual Local Area Network (VLAN) identifier, SSID, overall health score, onboarding score, connection score, network device to which the endpoint is connected, etc.). A detailed view of the health of each endpoint can also be provided by selecting that endpoint in the endpoints table 3036.

Figure 3H:
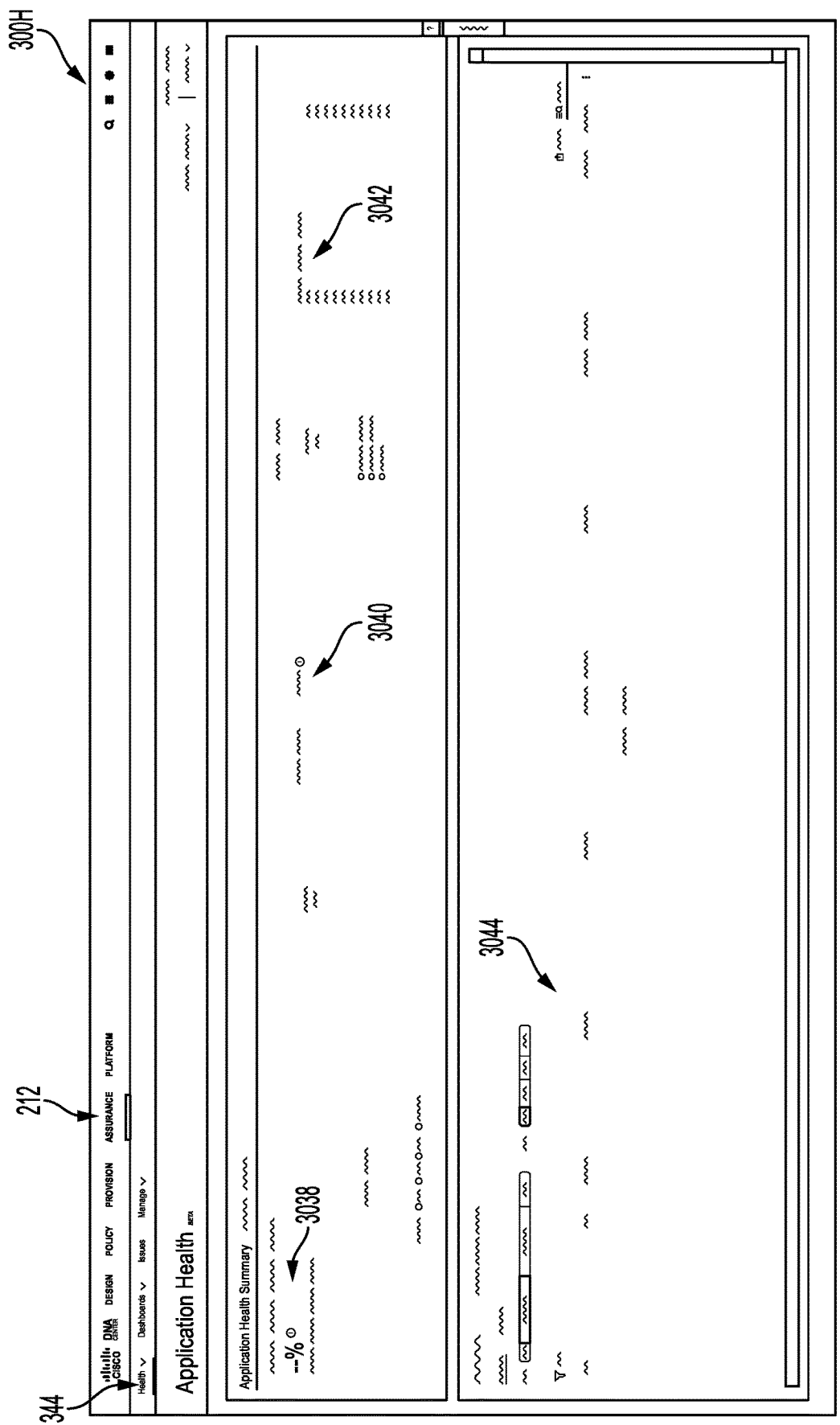

FIG. 3H illustrates a graphical user interface 300H, an example of a screen for an overview of the health of applications, which may be navigated to, for instance, by the toggling the health overview tool 345. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
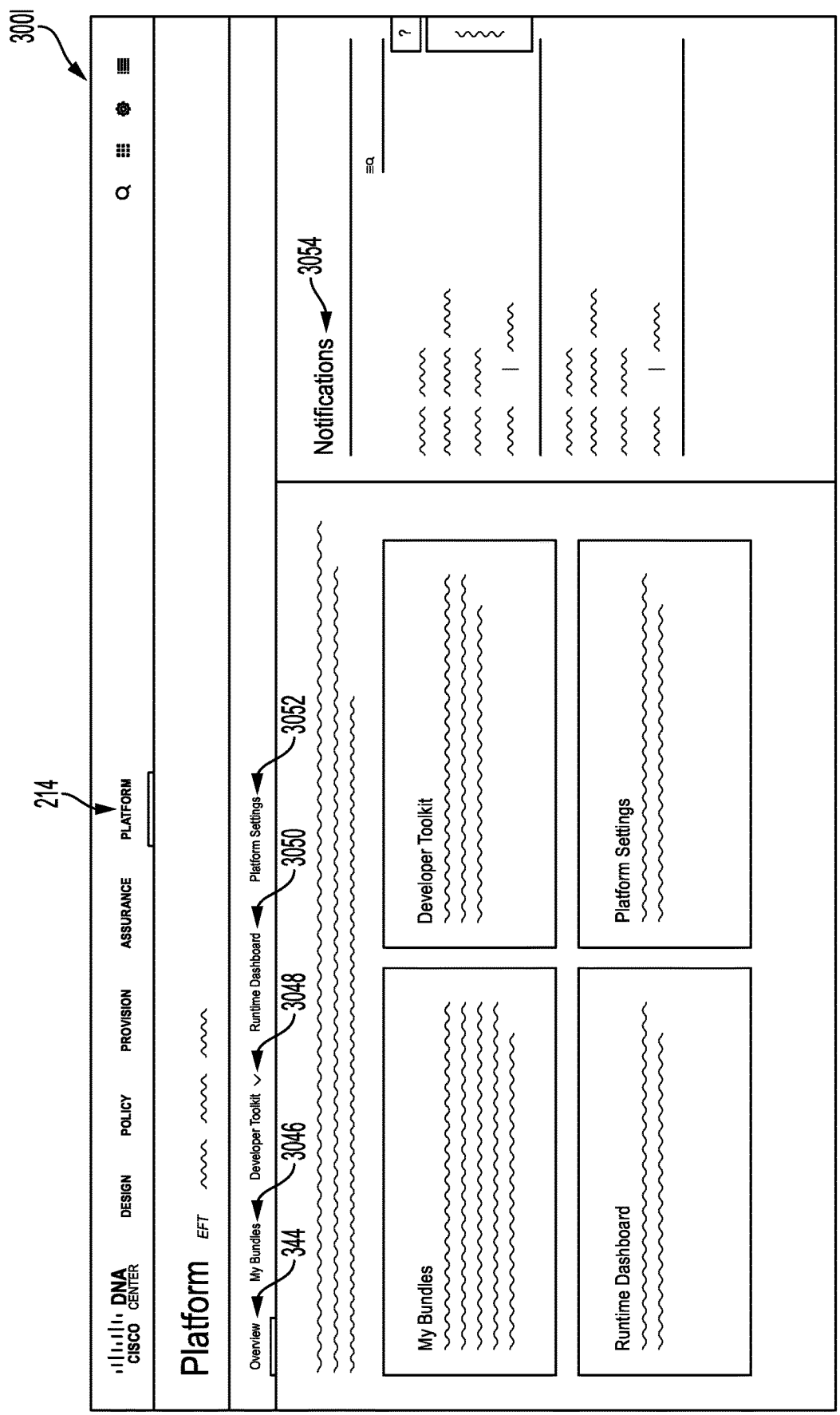

FIG. 3I illustrates an example of a graphical user interface 300I, an example of a landing screen for the platform functions 214. The graphical user interface 300C can include various tools and workflows for integrating with other technology systems. In this example, the platform integration tools and workflows include:

- A bundles tool 3046 for managing packages of domain-specific APIs, workflows, and other features for network programming and platform integration;
- A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
- A runtime dashboard 3050 for viewing and analyzing basic metrics or API and integration flow usage;
- A platform settings tool 3052 to view and set global or bundle-specific settings that define integration destinations and event consumption preferences; and
- A notifications user interface element 3054 for presenting notifications regarding the availability of software updates, security threats, and so forth.

Returning to FIG. 2, the controller layer 220 can comprise subsystems for the management layer 202 and may include a network control platform 222, a network data platform 224, and AAA services 226. These controller subsystems can form an abstraction layer to hide the complexities and dependencies of managing many network devices and protocols.

The network control platform 222 can provide automation and orchestration services for the network layer 230 and the physical layer 240, and can include the settings, protocols, and tables to automate management of the network and physical layers. For example, the network control platform 222 can provide the design functions 206, the policy functions 208, the provisioning functions 212, and the platform functions 214. In addition, the network control platform 222 can include tools and workflows for discovering switches, routers, wireless controllers, and other network devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network devices using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222.

The network data platform 224 can provide for network data collection, analytics, and assurance, and may include the settings, protocols, and tables to monitor and analyze network infrastructure and endpoints connected to the network. The network data platform 224 can collect multiple types of information from network devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network devices of the underlay 234 can establish connectivity between each other, such as via Internet Protocol (IP). The underlay may use any topology and routing protocol.

In some embodiments, the network controller appliances 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, QoS, capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network devices, such as switches and routers 110, 122, 124, and 126 and wireless elements 108 and 128 and network appliances, such as the network controller appliances 104, and the AAA appliances 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
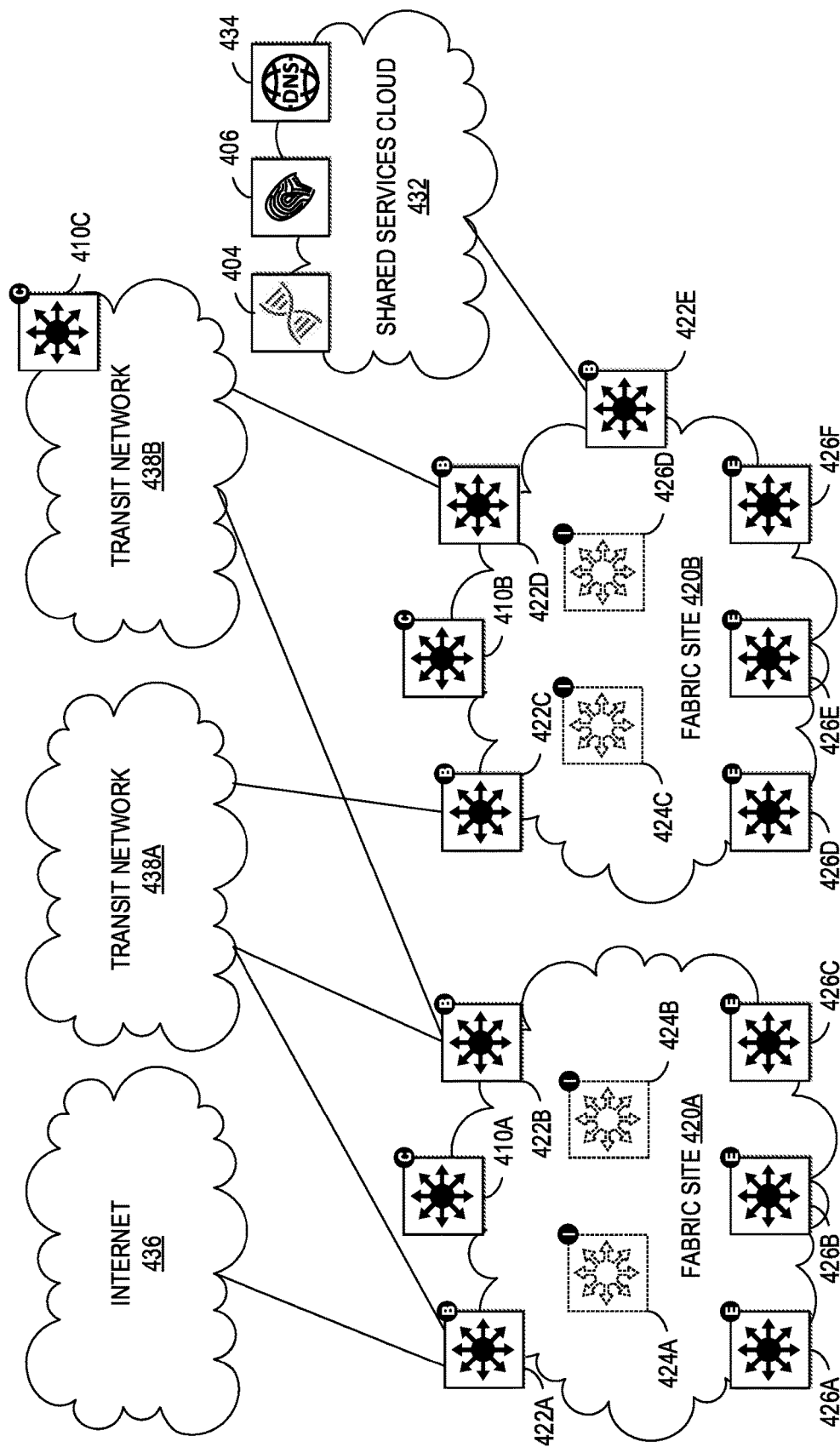
FIG. 4 illustrates an example of a physical topology for a multi-site enterprise network in accordance with an embodiment.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane nodes (e.g., software), and avoids hair-pinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5:
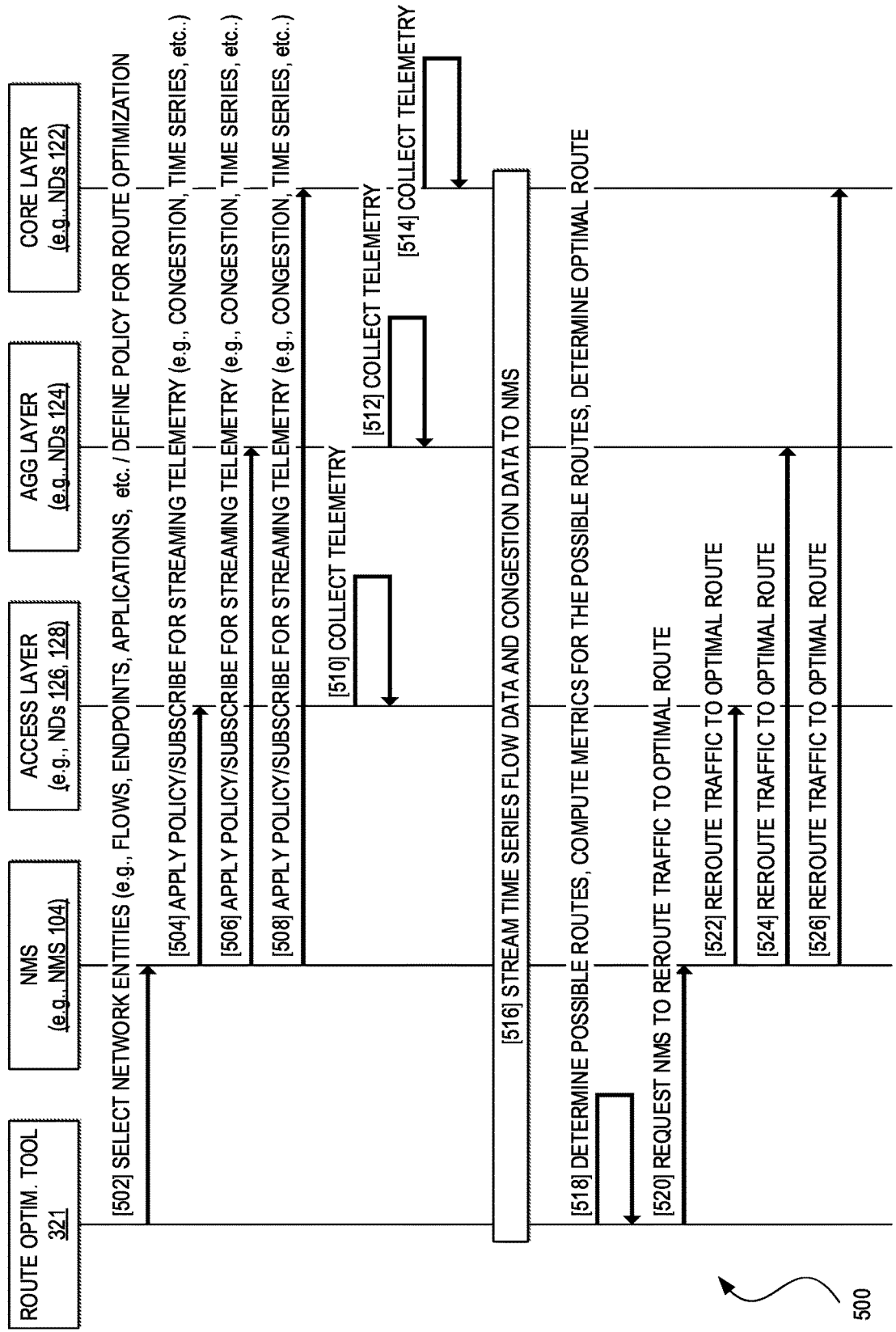
FIG. 5 illustrates an example of a sequence diagram for a process for determining an optimal route for a flow using real time traffic data in accordance with an embodiment.

FIG. 5 illustrates a sequence diagram of an example process 500 for optimizing routing of a flow using real time traffic feedback. One of ordinary skill will understood that, for any processes discussed herein, there can be additional, fewer, or alternative steps performed in similar or alternative orders, or in parallel, within the scope of the various embodiments unless otherwise stated. In this example, the process 500 may be performed within a network configured in a three-tier, multi-tier, or fat tree topology that includes a core layer (e.g., the fabric control nodes 110, the fabric border nodes 122, etc.), a distribution or aggregation layer (e.g., the fabric intermediate nodes 124), and an access layer (e.g., the fabric edge nodes 126 and wireless access points 128. Other embodiments may deploy networks using other configurations, such as spine-and-leaf, mesh, tree, bus, hub and spoke, or other topologies. The process 500 may also be performed in part by a network management system (e.g., the network management system implemented by the network controller appliances 104) including a route optimization application (e.g., the route optimization tool 321), an assurance system (e.g., the assurance functions 212), an analytics system (e.g., the network data platform 224), and the like. One or more of the route optimization application, the assurance system, or the analytics system may be integrated with one another and/or the network management system.

The sequence diagram 500 can begin with sequence 502 in which a network management system may receive a selection of one or more managed network entities (e.g., flows, sites, networks, network devices, endpoints, applications, or other network elements) for route optimization from a route optimization application. In some embodiments, the route optimization application can include a user interface (e.g., the user interfaces 204 or 300, the route optimization tool 321, graphical user interface, command line interface, an application programming interface (API), etc.) for selecting the managed network entities for route optimization. In some embodiments, the user interface may enable selection of flows for route optimization by IP source address, IP destination address, source port, destination port, protocol type, class of service, router or switch interface, or other flow attribute.

In some embodiments, the user interface may enable selection of sites or networks for route optimization by geographic location, building, floor, site identifier, IP address range, subnet, VLAN, VRF, network domain, or other site or network attribute. In some embodiments, the user interface may enable selection of network devices for route optimization by device name, IP Address, MAC Address, network operating system/firmware version, platform, device role (e.g., access, core, distribution, router, WLC, AP, etc.), location, or other network device attribute.

In some embodiments, the user interface may enable selection of endpoints for route optimization by hostname, IP address, MAC address, device type, client type (e.g., wired or wireless), health, location, VLAN identifier, VXLAN identifier (VNID), SGT, SSID, or other endpoint attribute.

In some embodiments, the user interface may enable selection of applications for route optimization by application name, domain name, health, usage, average throughput, traffic class, packet loss, network latency, application latency, custom filters, or other application attribute.

In other embodiments, one or more policies can be defined for selecting the managed network entities for route optimization. For example, the network management system can include policy functions (e.g., the policy functions 208) for selecting the managed network entities for the route optimization based on access control policies (e.g., via the access control policies tool 334), IP addresses (e.g., via the IP-based access control policies tool 336), QoS policies (e.g., via the application policies tool 338), and so forth. In some embodiments, the policies can include one or more matching conditions matching the traffic associated with the selected managed network entities and one or more actions to configure the network to perform route optimization for the selected managed network entities.

At sequences 504, 506, and 508, the network management system can apply the policies or establish the subscriptions for receiving streaming telemetry data for traffic associated with the selected managed network entities. In some embodiments, the network management system can subscribe to receive the streaming telemetry from every network device for which the network management system has administrative privileges. In other embodiments, the network management system may limit subscriptions to a segment of the network for which the network management system has administrative privileges and for which the selected managed network entities may access.

In general, the streamlining telemetry data may be indicative of packet loss, bit rate, throughput, transmission delay, availability, jitter, and so forth. For example, the network management can subscribe for congestion data (e.g., drop statistics and counters, queue depth, queue congestion, etc.) from network devices. Other embodiments may additionally or alternatively capture streaming telemetry from other managed network entities, such as by deploying agents (software and/or hardware, e.g., Application Specific Integrated Circuits (ASICs) or Field Programmable Gate Arrays (FPGAs)) in endpoints (e.g., Cisco Tetration Analytics™) or endpoint components (e.g., network interface controllers), agents in applications (e.g., AppDynamics®), and so forth.

Telemetry is an automated communications process by which measurements and other data can be collected at remote or inaccessible points and transmitted to receiving equipment for monitoring. Model-driven telemetry can provide a mechanism to stream data from a model-driven telemetry-capable device to a destination. In some embodiments, telemetry can use a subscription model to identify information sources and destinations. Model-driven telemetry can replace the need for the periodic polling of network devices; instead, a continuous request for information to be delivered to a subscriber can be established upon the network device. Then, either periodically, or as objects change, a subscribed set of data model objects (e.g., Yet Another Next Generation (YANG) data models) can be streamed to that subscriber.

A subscription can be a contract between a publisher and a subscriber that can describe the data that is wanted, when the data is wanted, and how the data is wanted. The data that is wanted can be defined by the use of a stream and filter specific to the stream. In some embodiments, streams may be based on the "yang-push" data model filters may be based on Extensible Markup Language (XML) Path Language (XPath). RFC 6020: YANG—A Data Modeling Language for the Network Configuration Protocol (NETCONF) and RFC 6241: Network Configuration Protocol (NETCONF), which are incorporated herein by reference, explain YANG-push, which is the subscription and push mechanism for YANG databases. YANG-push subscriptions are defined using a data model. Using YANG-push, subscriber applications can request a continuous, customized stream of updates from YANG databases. The YANG-push can encompass data in the configuration and operational databases that is described by the YANG model installed on a device.

When the data is wanted can be set to when the data changes or at periodic intervals. With periodic subscriptions, the first push-update with the subscribed information can be sent immediately; but may be delayed if the device is busy or due to network congestion. Updates can then be sent at the expiry of the configured periodic timer. For example, if the period is configured as 10 minutes, the first update can sent immediately after the subscription is created and every 10 minutes thereafter. Period can be time, in centiseconds (1/100 of a second), between periodic push updates. For example, a period of 1000 can result in getting updates to the subscribed information every 10 seconds.

How the data is wanted can be specified by the encoding of the data and the transport protocol. Various encodings may be supported, such as XML, Javascript Notation (JSON), Type Definition Language (TDL), and so forth. In some embodiments, Network Configuration Protocol (NETCONF) may be used as the transport protocol. Thus, telemetry subscriptions and updates may be transmitted over NETCONF sessions. The NETCONF session that is used to establish a telemetry subscription can receive the telemetry updates. If the NETCONF session is torn down or the connection is lost, associated telemetry subscriptions may also be torn down.

Tables 1 and 2 set forth example instructions for establishing subscriptions for receiving congestion data from network devices. For example, Table 1 and Table 2 can include commands that may be issued in a command line interface or console for a network operating system (e.g., Cisco Internetworking Operating System (IOS®), Cisco IOS® XE, Cisco IOS® XR, Cisco® NX-OS, Cisco® Catalyst OS (CatOS), etc.) to subscribe to streaming telemetry for congestion data.

TABLE 1

Example Subscription for Drop Statistics and Counters telemetry ietf subscription 500
encoding encode-tdl
filter tdl-uri
/services;serviceName=fed_intf_xcvr_oper/interface_drop
stream native
update-policy periodic 200 (2 sec interval)
receiver ip address 10.30.216.244 4500 protocol native

TABLE 2

Example Subscription for Queue Depth and Queue Congestion telemetry ietf subscription 600
encoding encode-tdl
filter tdl-uri /services;serviceName=fed_qos_oper/pm_qos_info
stream native
update-policy on-change
receiver ip address 10.30.216.244 4500 protocol native In addition to the congestion data, the network management system can also establish subscriptions for receiving streamlining telemetry comprising time series flow data of the traffic associated with the selected managed network entities. These subscriptions can be applied in the data plane to specify what, how, and when to collect the streaming telemetry from the selected managed network entities. For example, the network management system can configure the network devices to stream the time series flow data by stripping the payload of packets, encapsulating the original packet headers with a custom header, and transmitting the encapsulated packets over IP using Encapsulated Remote Switch Port Analyzer (ERPSPAN). In some embodiments, the custom header can comprise a source-generated timestamp and flow identifier. ERSPAN can mirror traffic on one or more source ports, VLANs, or other interfaces, and deliver the mirrored traffic to one or more destination ports, VLANs, or other interfaces. The mirrored traffic can be encapsulated in Generic Routing Encapsulation (GRE). Using this approach, the network devices can transit time series flow data to the network management system at line rate. For example, certain ASICs, such as the Cisco® Unified Access Data Plane (UADP) ASIC can support three times internal bandwidth as compared to external bandwidth. With three header additions and no payloads, a network device can stream a packet out to the network management system at line rate.

Figure 6:
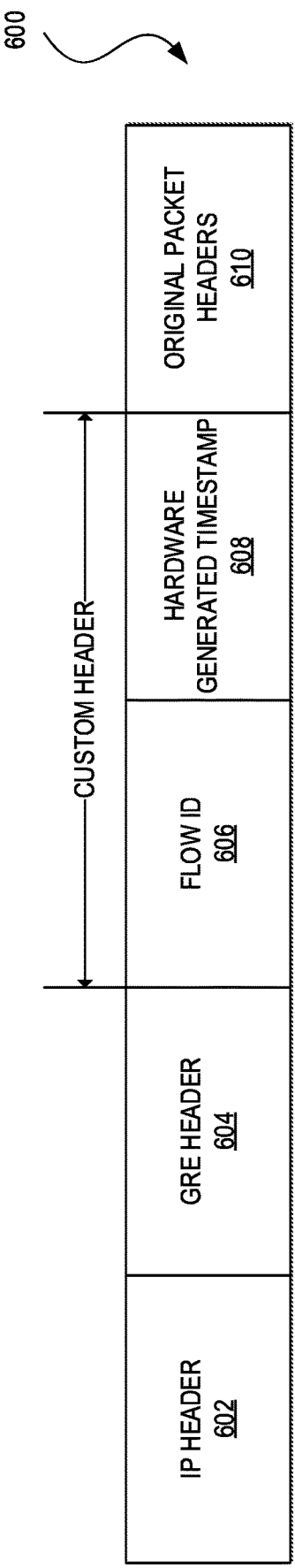
FIG. 6 illustrates an example of a format for streaming telemetry data in accordance with an embodiment.

FIG. 6 illustrates an example of a format for time series flow data 600 that the network management system can receive from the network devices. The time series flow data may include an IP header 602, a GRE header 604, a custom header comprising a flow identifier 606 and a hardware generated timestamp 608, and original packet headers 610. The original packet headers 160 may include flow priority, Diff Serve Code Point (DSCP), and/or other information for classifying the flow.

A network device can receive a packet in the data plane and forward the packet in the normal course of operation of the network device. In addition, as discussed, the network device can strip the payload from the packet, generate a custom header including the flow identifier 606 and hardware-generated timestamp 608, and encapsulate the original packet headers 610 with the IP header 602, GRE header 604, and custom header for transmission to the network management system over IP and ERSPAN.

In some embodiments, the selected managed network entities may correspond to different traffic classes or different QoS classes and the streaming telemetry data can include congestion data and time series flow data of the different traffic classes or the different QoS classes.

The process 500 can continue with sequences 510, 512, and 514 in which the network devices can collect the streaming telemetry data for storage locally for a period of time based on the established subscriptions. At sequence 516, the network devices can transmit, to the network management system, the time series flow data using IP and ERSPAN and the congestion data using a streaming telemetry mechanism. The network management system can aggregate the data and store the data in a time series database (e.g., a type definition language (TDL) database and/or an in-memory transactional database).

At sequence 518, the route optimization application can determine a set of possible routes (e.g., next hops, segments, end-to-end paths, etc.) for the traffic associated with the selected managed network entities, compute metrics for the set of possible routes, and select the optimal route based on the metrics. In some embodiments, these processes may be preceded by a triggering event, such as the network management system detecting that one or more current metrics (e.g., packet loss, bit rate, throughput, delay, availability, jitter, etc.) for the traffic fail to satisfy various thresholds. As another example, the network management system may predict that network performance will fall below the various thresholds based on trends or patterns discovered by an analytics or assurance engine processing historical traffic data and correlating the trends or patterns to the current conditions of the network determined by the streaming telemetry.

In some embodiments, the network management system can collect streaming telemetry over a duration and identify periods of time or other patterns or trends indicative of traffic congestion and high network latency. The network management system can preemptively or proactively inject alternative routes during periods of time of low bandwidth or delay below specified thresholds or when the route optimization application anticipates or predicts these conditions. The network management system can eject the alternative routes when these periods of time or events of congestion and high latency subsist.

At step 520, if the optimal route differs from a native route (e.g., a route determined by the routing protocols running in the network) in the routing tables of the network devices, the route optimization application may request the network management system to reroute the traffic associated with the selected managed network entities to the optimal route.

The process 500 may conclude with sequences 522, 524, and 526 in which the network management system can reroute to traffic associated with the selected managed network entities to the optimal route. For example, the network management system can inject the optimal route as a temporary static or default route in the routing tables of the network devices so as to override a native route or the route in the routing tables determined by routing protocols running in the network. That is, the network management system can inject the static or default routes so as to invert route priority for the traffic associated with the selected managed network entities to be prioritized over the native route. In some embodiments, the optimal route may be determined on a per hop basis (excluding re-traversals and loops) as the traffic associated with the selected managed network entities is routed through the network. In other embodiments, the optimal route may be determined on a per segment basis or on an end-to-end path basis.

Figure 7:
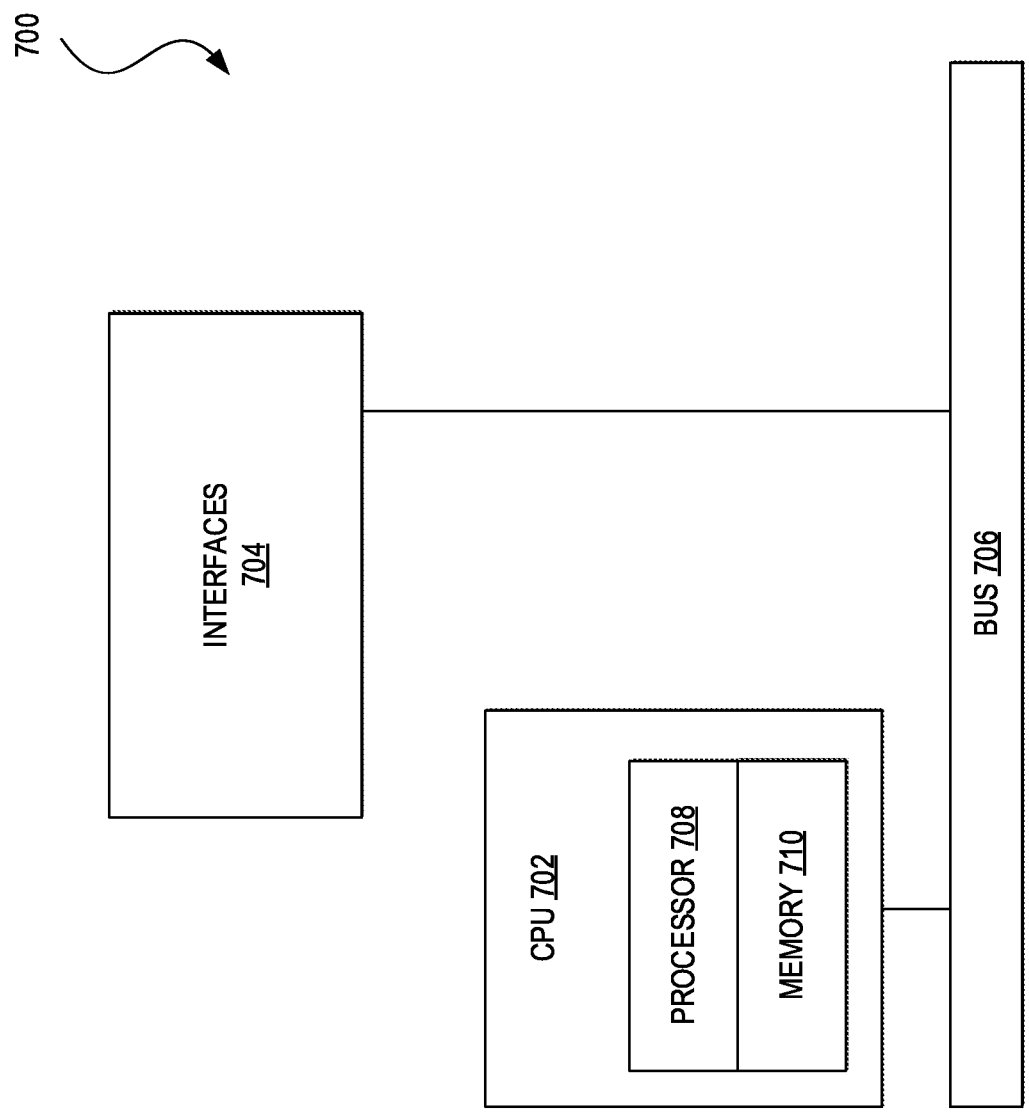
FIG. 7 illustrates an example of a network device in accordance with an embodiment.

FIG. 7 illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
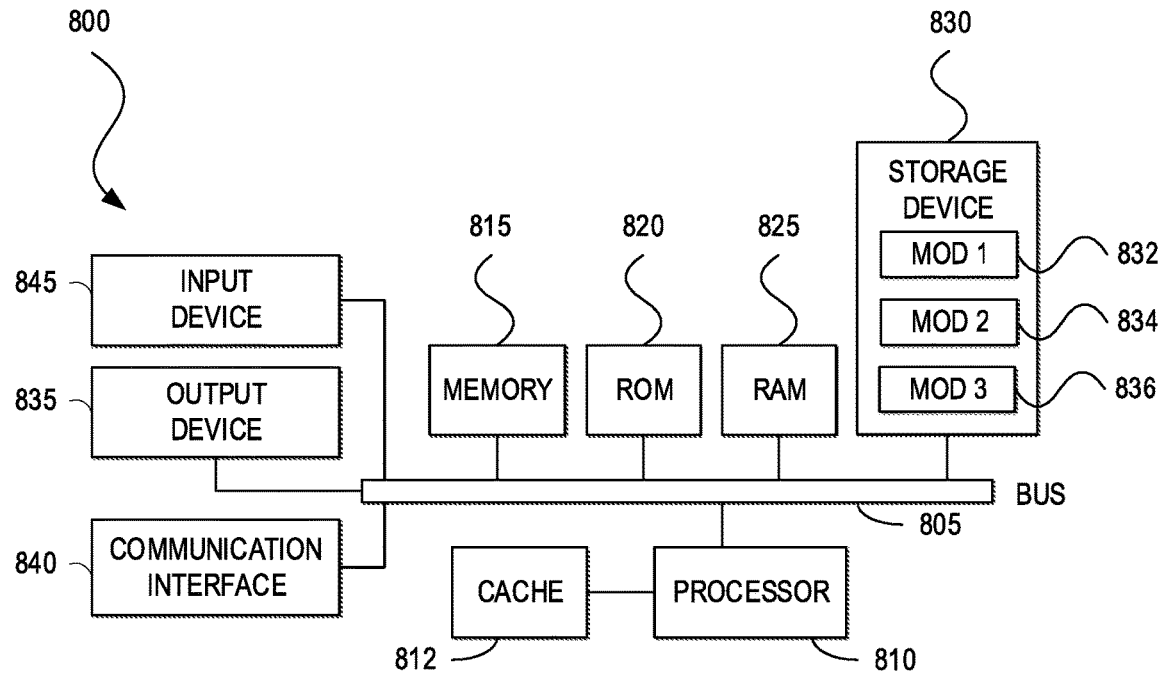
FIGS. 8A and 8B illustrate examples of systems in accordance with some embodiments.
Figure 8B:
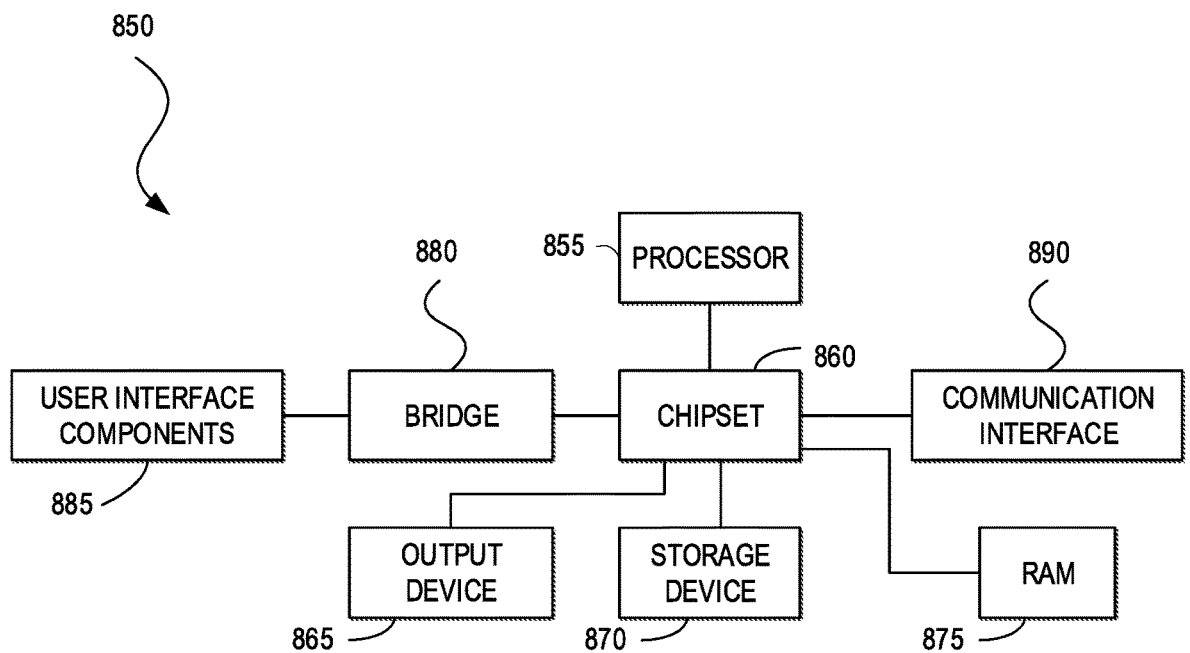

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   subscribing, by a network management system, to receive streaming telemetry data for traffic associated with one or more managed network entities selected for route optimization;
   in response to the subscription, receiving, by the network management system, streaming telemetry data for traffic associated with the one or more managed network entities selected for route optimization;
   computing, by the network management system, metrics for a set of possible routes for the traffic based on the streaming telemetry data;
   determining, by the network management system, an optimal route from the set of possible routes based on the metrics; and
   injecting, by the network management system, the optimal route into a network device receiving the traffic to override a native route in a routing table of the network device.

2. The computer-implemented method of claim 1, further comprising:
   receiving second streaming telemetry data for second traffic associated with the one or more managed network entities selected for route optimization;
   computing second metrics for a set of next hops from a first next hop of the optimal route;
   determining a second next hop from the set of next hops based on the second metrics; and
   injecting the second next hop into a second network device receiving the second traffic to override a native next hop in a second routing table of the second network device.

3. The computer-implemented method of claim 1, further comprising:
   receiving, by the network device, a first packet;
   generating, by the network device, a second packet a flow identifier, a hardware-generated timestamp, and one or more original headers of the first packet, and excluding an original payload of the first packet; and
   transmitting, by the network device to the network management system, the second packet at line rate.

4. The computer-implemented method of claim 3, wherein the second packet further includes an Encapsulated Remote Switched Port Analyzer (ERSPAN) header.

5. The computer-implemented method of claim 1, wherein the streaming telemetry data includes at least one of drop statistics and counters, queue depth, or queue congestion data of the network device.

6. The computer-implemented method of claim 1, further comprising:
   receiving a selection of the one or more managed network entities from a user interface of the network management system.

7. The computer-implemented method of claim 1, further comprising:
   receiving a policy including one or more matching conditions matching the traffic associated with the one or more managed network entities and one or more actions to configure a network to perform the route optimization.

8. The computer-implemented method of claim 1, further comprising:
   determining the set of possible routes based on the streaming telemetry data.

9. The computer-implemented method of claim 8, wherein determining the set of possible routes occurs in response to the network management system detecting that one or more current metrics for the traffic fail to satisfy a threshold.

10. The computer-implemented method of claim 9, further comprising:
    determining that one or more second metrics for second traffic satisfy the threshold;
    ejecting the optimal route from the network device; and
    routing the second traffic by the native route in the routing table of the network device.

11. The computer-implemented method of claim 8, wherein determining the set of possible routes occurs in response to predicting that one or more metrics for the traffic will fail to satisfy a threshold.

12. The computer-implemented method of claim 1, further comprising:
    determining a network segment for which the network management system has administrative privileges and for which the one or more managed network entities have access,
    wherein the network management system limits subscriptions to receive the streaming telemetry data to the network segment.

13. A system, comprising:
    one or more processors; and
    memory including instructions that, when executed by the one or more processors, cause the system to:

subscribe to receive streaming telemetry data for traffic associated with one or more managed network entities selected for route optimization;

in response to the subscription, receive streaming telemetry data for traffic associated with the one or more managed network entities selected for route optimization;

compute metrics for a set of possible routes for the traffic based on the streaming telemetry data;

determine an optimal route from the set of possible routes based on the metrics; and inject the optimal route into a network device receiving the traffic to override a native route in a routing table of the network device.

14. The system of claim 13, wherein the one or more managed network entities includes a flow.

15. The system of claim 13, wherein the one or more managed network entities includes at least one of a site, a network, a network device, an endpoint, or an application, and wherein the instructions, when executed, further cause the system to:

determining one or more matching conditions for matching the traffic associated with the one or more managed network entities selected for route optimization.

16. The system of claim 13, wherein the system subscribes to receive the streaming telemetry data from each network device for which the system has administrative privileges.

17. A non-transitory computer-readable storage medium including instructions that, upon being executed by one or more processors of a system, cause the system to:

subscribe to receive streaming telemetry data for traffic associated with one or more managed network entities selected for route optimization;

in response to the subscription, receive streaming telemetry data for traffic associated with the one or more managed network entities selected for route optimization; compute metrics for a set of possible routes for the traffic based on the streaming telemetry data;

determine an optimal route from the set of possible routes based on the metrics; and inject the optimal route into a network device receiving the traffic to override a native route in a routing table of the network device.

18. The non-transitory computer-readable storage medium of claim 17, wherein the optimal route is a next hop.

19. The non-transitory computer-readable storage medium of claim 17, wherein the optimal route is one of a segment or an end-to-end path.

20. The non-transitory computer-readable storage medium of claim 17, wherein the streaming telemetry data includes congestion data and time series flow data from multiple traffic classes or multiple quality of service (QoS) classes.

* * * * *